US006565821B1

(12) United States Patent
Fraysse

(10) Patent No.: US 6,565,821 B1
(45) Date of Patent: May 20, 2003

(54) PROCESS FOR REMOVING THE FLUOROCOMPOUNDS OR FLUOROSULPHUR COMPOUNDS FROM A STREAM OF XENON AND/OR KRYPTON BY PERMEATION

(75) Inventor: Philippe Fraysse, Montigny le Bretonneux (FR)

(73) Assignee: L'Air Liquide - Société Anonyme Á Directoire et Conseil de Surveillance pour l'Etude et l'Exploitation des Procédés Georges Claude, Paris Cedex (FR)

( * ) Notice: Subject to any disclaimer, the term of this patent is extended or adjusted under 35 U.S.C. 154(b) by 141 days.

(21) Appl. No.: 09/655,911

(22) Filed: Sep. 5, 2000

(30) Foreign Application Priority Data

Sep. 6, 1999  (FR) ............................. 99 11114

(51) Int. Cl.[7] .......................... B01D 53/22; C01B 23/00
(52) U.S. Cl. ................ 423/240 R; 423/245.1; 423/245.3; 423/262; 95/45; 95/48; 95/49; 95/50
(58) Field of Search .............. 423/262, 242.1, 423/240 R, 240 S, 245.1, 245.3; 95/45, 48, 49, 50

(56) References Cited

U.S. PATENT DOCUMENTS

| 4,078,907 A | 3/1978 | Schlea ...................... 95/45 |
| 4,119,417 A | * 10/1978 | Heki et al. ................... 96/7 |
| 4,277,363 A | * 7/1981 | Duhayon et al. ........... 376/313 |
| 4,400,183 A | 8/1983 | Henrich et al. .............. 95/180 |
| 5,102,432 A | * 4/1992 | Prasad ........................ 95/54 |
| 5,626,033 A | * 5/1997 | Tamhankar et al. ........ 62/617 |
| 5,919,285 A | 7/1999 | Li et al. ..................... 95/175 |
| 5,976,222 A | * 11/1999 | Yang et al. ................. 95/131 |

FOREIGN PATENT DOCUMENTS

| EP | 0 863 375 | 9/1998 |
| WO | WO 98/28062 | 7/1998 |
| WO | WO 98/32521 | 7/1998 |

\* cited by examiner

Primary Examiner—Ngoc-Yen Nguyen
(74) Attorney, Agent, or Firm—Young & Thompson

(57) ABSTRACT

A process and a plant for removing the gaseous fluorocompounds or fluorosulphur compounds, such as $CF_4$, $C_2F_6$, and $SF_6$, present in a stream of xenon and/or krypton, by permeation via one or more membranes, such as polymer membranes. The xenon and/or krypton thus produced may then be further purified or separated by cryogenic distillation. Prior to the permeation step, the other impurities, particularly the hydrocarbons, may be removed by oxidative catalysis and subsequent adsorption of the carbon dioxides and of the water produced. The xenon, the krypton and the xenon/krypton mixtures free of gaseous fluorocompounds or fluorosulphur compounds and purified by such process can be used as plasma propulsion gas, especially for satellites, or as inter-pane insulation gas for a sealed unit, particularly for double-glazing windows.

19 Claims, 2 Drawing Sheets

PROCESS FOR REMOVING THE FLUOROCOMPOUNDS OR FLUOROSULPHUR COMPOUNDS FROM A STREAM OF XENON AND/OR KRYPTON BY PERMEATION

FIELD OF THE INVENTION

The present invention relates to a process for purifying a gas stream containing krypton (Kr) and/or xenon (Xe), which gas stream contains, in addition, fluorine- and/or fluorosulphur-containing impurities and possibly other impurities that have to be separated from the said gas stream, such as oxygen and/or hydrocarbons ($C_nH_m$), the said gas stream then being able to be separated by cryogenic distillation, in order to produce high-purity krypton or xenon, or else possibly being a waste gas from such a cryogenic distillation

BACKGROUND OF THE INVENTION

The production of xenon or krypton is usually carried using atmospheric air, which air is separated by cryogenic distillation, so as to obtain, on the one hand, the conventionally recovered compounds, namely nitrogen, oxygen and/or argon, and, on the other hand, a gas mixture essentially containing xenon, krypton and impurities chosen from hydrocarbons ($C_nH_m$), oxygen and fluorocompounds or fluorosulphur compounds, such as $CF_4$, $C_2F_6$ or $SF_6$ for example.

Next, this gas mixture, essentially containing xenon, krypton and impurities, is:

- either immediately separated and purified in order to obtain xenon on the one hand and krypton on the other hand;
- or put into containers, such as gas bottles, and stored, before being separated and purified, as in the first case, later on.

At the present time, there are several known techniques which can be used to remove the fluorine- or fluorosulphur-containing impurities, such as the compounds $CF_4$, $C_2F_6$ or $SF_6$, which may be contained in a gas or a gas mixture.

Among these known techniques, mention may be made of chemisorption, the plasma technique and hot catalytic destruction.

Thus, the technique of chemisorption of the fluorine-containing impurities on an adsorbent material of the phyllosilicate type, as described in document EP-A-863,375, is difficult to use on an industrial scale because of the complexity of the process and raises certain reliability problems.

Other documents propose to eliminate the fluorocompounds, often called PFC (standing for PerFluoroCompounds), by means of polymer membranes.

Thus, document EP-A-754,487 discloses a very effective process for removing by permeation, by means of one or more polymer membranes, the PFCs contained in a gas stream consisting of a carrier gas, such as air, oxygen, nitrogen, helium, $CO_2$, xenon, CO, water vapour, hydrogen, krypton, neon or argon, contaminated with PFCs. This process is particularly suitable for removing the PFCs contained in a gas stream coming from a semiconductor fabrication process.

Moreover, document WO-A-90/15662 describes the use of a permselective membrane for separating a gas mixture, particularly a membrane consisting of an amorphous polymer of the perfluoro-2,2-dimethyl-1,3-dioxol type. The gas mixture may be air—a gas mixture of the nitrogen/oxygen type—which possibly contains one or more organic compounds, such as fluorocarbon compounds or any other volatile compound, such as Freon.

Furthermore, document EP-A-358,915 describes a membrane system for gas separation, in which any degradation of the membrane is minimized or prevented by removing the heavy-hydrogen-type impurities by adsorption of the latter on a bed of active carbon lying upstream of the membrane.

Moreover, documents JP-A-61,187,918 and JP-A-4,322,716 relate to the use of a membrane formed from a fluorocopolymer to remove water vapour from a wet gas, such as HCl, $CF_4$, $C_2F_6$ or the like, i.e. to dry such a wet gas.

More generally, mention may also be made of document JP-A-4,016,213 which describes the selective permeation of light alcohols, such as ethanol, contained in a gas mixture through a membrane consisting of a heat-resistant polymer, document JP-A-61,187,918 which teaches the use of a membrane formed from a fluorocopolymer to separate a gas used in a welding operation and document U.S. Pat. No. 5,383,957 which relates to a membrane system that can be used to produce nitrogen from air.

Furthermore, there are other, more or less specific, publications reporting processes which use membranes to separate a gas mixture, namely documents

| US-A-4,957,513, | US-A-4,941,893, | US-A-4,178,224, |
| --- | --- | --- |
| US-A-4,424,067, | EP-A-239,190, | JP-A-60,022,902, |
| US-A-4,701,187, | US-A-4,880,441, | US-A-4,881,953, |
| US-A-4,988,371, | US-A-5,051,114, | US-A-5,064,447, |
| US-A-5,256,295, | US-A-5,281,253, | US-A-5,282,964, |
| US-A-5,282,969, | US-A-5,290,341 | and |
|  |  | WO-A-95/18674 |

However, these various techniques are often complex to use on an industrial scale, sometimes generating reliability and safety problems, and requiring, in some cases, considerable investment, and often high operating costs.

In addition, some of these processes cannot be applied to the purification of gas mixtures essentially containing xenon and/or krypton and/or do not allow effective removal of all the impurities likely to be present in the gas stream, namely mainly fluorocompounds or fluorosulphur compounds.

SUMMARY OF THE INVENTION

The object of the present invention is therefore to propose an improved process making it possible to achieve effective removal of the fluorine- or fluorosulphur-containing impurities which are contained in a xenon and/or krypton gas stream, which process is easy to employ and of acceptable costs from the industrial standpoint.

In other words, the present invention aims to provide a process for separating and purifying a gas stream containing krypton and xenon, as well as impurities, so as to remove the said impurities (fluorocompounds or fluorosulphur compounds) effectively.

Furthermore, in the case of a krypton/xenon mixture that has to be separated into each of these components, the invention also aims to provide, as an alternative, a process for the effective separation of the krypton/xenon mixture thus obtained and this separation being carried out in order to produce, on the one hand, high-purity xenon and, on the other hand, high-purity krypton, combined with effective removal of the said fluorocompounds or fluorosulphur compounds.

The invention therefore relates to a process for removing at least some of the gaseous fluorocompounds and/or fluorosulphur compounds present in a gas feed stream containing xenon and krypton, in which:
(i) the gas feed stream containing xenon and/or krypton and at least the said gaseous fluorocompounds and/or fluorosulphur compounds are brought into contact with at least one first membrane;
(ii) a production gas containing xenon and/or krypton stripped of at least some of the said gaseous fluorocompounds and/or fluorosulphur compounds is recovered on the output side of at least the said first membrane.

Within the context of the invention, the term "membrane" denotes any permeation means, especially membranes taken as they are, but also membrane modules, especially membrane modules based on hollow fibres, or else ceramic or similar membranes.

Moreover, within the context of the invention, the term "output side" should be understood to mean that side of the membrane from which the gas produced is recovered, that is to say the gas substantially purified of fluorine- or fluorosulphur-containing impurities. In the case of a membrane operating by conventional permeability, the "output side" is the permeate side, whereas in the case of a membrane operating by reverse permeability, the output side is the retentate side.

By analogy, within the context of the invention the term "waste gas side" should be understood to mean the opposite side of the membrane to the one where the gas produced is recovered, that is to say the side of the membrane via which a gas enriched with fluorine- or fluorosulphur-containing impurities leaves. In the case of a membrane operating by conventional permeability, the "waste gas side" is the retentate side, whereas in the case of a membrane operating by reverse permeability, the "waste gas side" is the permeate side.

According to a first variant, the invention also relates to a process for removing at least some of the gaseous fluorocompounds and/or fluorosulphur compounds present in a feed gas formed from a mixture of xenon and krypton, in which:
(i) the feed gas containing xenon and krypton and the said gaseous fluorocompounds and/or fluorosulphur compounds is brought into contact with at least one first membrane;
(ii) a production gas formed from a mixture of xenon and/or krypton stripped of at least some of the said gaseous fluorocompounds and/or fluorosulphur compounds is recovered on the output side of at least the said first membrane;
(iii) the production gas formed from a mixture of xenon and/or krypton is subjected to at least one cryogenic distillation step;
(iv) after cryogenic distillation, a stream of krypton, substantially free of the said gaseous fluorocompounds and/or fluorosulphur compounds, and/or a stream of xenon, substantially free of the said gaseous fluorocompounds and/or fluorosulphur compounds, is recovered.

According to a second variant, the invention also relates to a process for removing at least some of the gaseous fluorocompounds and/or fluorosulphur compounds present in a recycling gas coming from a process generating at least the said recycling gas, the said recycling gas containing xenon and/or krypton and containing, in addition, gaseous fluorocompounds and/or fluorosulphur compounds as impurities, in which:
(i) the recycling gas containing xenon and/or krypton and the said gaseous fluorocompounds and/or fluorosulphur compounds is brought into contact with at least one first membrane;
(ii) a production gas containing xenon and/or krypton stripped of at least some of the said gaseous fluorocompounds and/or fluorosulphur compounds is recovered on the output side of at least the said first membrane, preferably at least some of the said production gas then being sent to the process which generates at least the said recycling gas in order to be possibly be reused therein.

Depending on the case, the process of the invention may comprise one or more of the following characteristics:

in step (ii), a stream of waste gas containing at least some of the said gaseous fluorocompounds and/or fluorosulphur compounds is recovered on the waste gas side of the said first membrane. This stream of waste gas is substantially at the same pressure as that of the stream of feed gas entering the said first membrane, but it contains a higher proportion of fluorocompounds or fluorosulphur compounds than that of the feed gas, that is to say the stream of waste gas is enriched in fluorocompounds or fluorosulphur compounds compared with the stream of feed gas;

the gas feed stream contains at least 40% xenon and/or krypton, preferably at least 50% xenon and/or krypton, preferably at least 70% xenon and/or krypton, preferably at least 80% xenon and/or krypton, and/or the gas feed stream contains xenon and krypton with a concentration of more than 99.999%;

the gas feed stream contains from 1 ppb to 300,000 ppm of fluorocompounds or fluorosulphur compounds, preferably 10 ppb to 50,000 ppm of fluorocompounds or fluorosulphur compounds;

at least part of the gas feed stream is a stream of a waste gas coming from one or more cryogenic distillation columns, which waste gas has, optionally, been pretreated, put into containers and/or stored;

the fluorocompounds or fluorosulphur compounds to be removed are chosen from the compounds $CF_4$, $C_2F_6$, $SF_6$ and mixtures thereof;

the gas feed stream contains from 0.01 ppm to 1000 ppm of $CF_4$, from 0.01 ppm to 1000 ppm of $SF_6$ and/or from 0.01 ppm to less than 200 ppm of $C_2F_6$;

the stream of production gas, recovered in step ii) on the output side of the said first membrane and containing at least some of the xenon and/or krypton, is introduced into the feed inlet of at least one second permeation membrane;

the stream of waste gas, recovered in step ii) on the waste gas side of the said first membrane and containing at least some of the said gaseous fluorocompounds and/or fluorosulphur compounds, is introduced into the feed inlet of at least one third permeation membrane;

the gas feed stream is at a temperature ranging from −10° C. to +100° C., preferably at a temperature ranging from 0° C. to +60° C. If necessary, the temperature of the gas feed stream may be regulated or adjusted in order to bring it into or maintain it in this temperature range, by heating or cooling, depending on the case;

the gas feed stream is at a pressure ranging from 1 bar to 50 bar, preferably the stream is at a pressure ranging from 3 bar to 30 bar and even more preferably about 6 bar to 12 bar approximately, while it is being brought into contact with the said first permeation membrane. If necessary, the pressure of the gas feed stream may be regulated or adjusted in order to bring it into or maintain it in this pressure range;

at least one membrane is made of a polymer. For example, membranes that can be used within the context of the invention are described in document EP-A-754,487, incorporated here by reference, or in other documents cited by the said document EP-A-754,487;

the gas feed stream contains, in addition, impurities chosen from hydrocarbons ($C_nH_m$, such as methane and hydrocarbons in which n=2 or n=3, and at least some of the said impurities are removed by oxidative catalysis of the said impurities into $CO_2$ and $H_2O$, in the presence of oxygen and at a temperature of between 80° C. and 600° C., preferably about 150° C. to 500° C.;

at least some of the $CO_2$ and $H_2O$ impurities, which are produced by oxidative catalysis or are possibly present in the stream of feed gas, are removed by adsorption or drying on at least one adsorbent, preferably at least one adsorbent being chosen from zeolites, aluminas or silica gels;

the adsorbent comprises a type A zeolite or faujasite, preferably a type X zeolite having an Si/Al ratio of between 1 and 1.10, and/or an activated alumina, preferably an activated alumina containing, or impregnated with, metal cations, particularly potassium or sodium cations. Of course, the zeolite may also be exchanged with metal cations, such as lithium, calcium or similar cations;

the adsorption step is carried out at a temperature of between approximately −40° C. and +100° C., preferably at a temperature of between +5° C. and +50° C., and/or at an adsorption pressure of between 1 and 100 bar, preferably between 1.1 bar and 50 bar;

the adsorption step is performed according to a PSA (Pressure Swing Adsorption) or TSA (Temperature Swing Adsorption), preferably TSA, cycle;

the production gas recovered in step ii) is subjected to at least one step of cooling it to a temperature of less than −5° C., preferably to a temperature ranging from −10° C. to −150° C.;

the stream of production gas, recovered in step ii) on the output side of the first membrane, is introduced into the feed inlet of a second membrane, a second waste gas is recovered on the waste gas side of the said second membrane and that the said second waste gas is introduced into the gas feed stream;

the stream of waste gas recovered in step ii) on the waste gas side of the first membrane is introduced into the feed inlet of a third membrane, a second production gas is recovered on the output side of the said third membrane and the second production gas is introduced into the gas feed stream.

Furthermore, the invention also relates to a process for removing at least some of the gaseous fluorocompounds or fluorosulphur compounds, particularly $CF_4$, $C_2F_6$ and/or $SF_6$, present in a xenon and/or krypton gas stream, preferably a mixture of xenon and krypton, in which at least some of the said fluorocompounds are separated by one or more permeation steps, by means of one or more membranes of the conventional or reverse type, depending on the case.

According to another aspect, the invention relates to a plant for removing the gaseous fluorocompounds and/or fluorosulphur compounds present in a feed gas formed from xenon and/or krypton, capable of carrying out a process according to the invention, which comprises:

at least one source of a feed gas containing xenon and/or krypton and gaseous fluorocompounds and/or fluorosulphur compounds to be removed;

means for compressing the feed gas, such as a gas compressor;

at least one membrane connected via its production output to means for recovering a production gas formed from xenon and/or krypton and stripped of at least some of the said gaseous fluorocompounds and/or fluorosulphur compounds.

As a variant, the invention also relates to a plant for removing the gaseous fluorocompounds and/or fluorosulphur compounds present in a feed gas formed from xenon and/or krypton, capable of carrying out a process according to the invention, which comprises:

at least one source of a feed gas containing xenon and/or krypton and gaseous fluorocompounds and/or fluorosulphur compounds to be removed;

means for compressing the feed gas;

at least one membrane connected via its production output to means for recovering a production gas formed from xenon and/or krypton and stripped of at least some of the said gaseous fluorocompounds and/or fluorosulphur compounds;

means for cooling the production gas down to a cryogenic temperature, the said cooling means being located downstream of at least the said membrane;

means for cryogenic distillation of the production gas, the said distillation means being located downstream of the means for cooling down to a cryogenic temperature;

recovery means, located downstream of the cryogenic distillation means, for recovering krypton substantially free of the said gaseous fluorocompounds and/or fluorosulphur compounds, and/or xenon substantially free of the said gaseous fluorocompounds and/or fluorosulphur compounds.

According to one particular embodiment, the plant of the invention includes, in addition, at least one membrane connected, via its waste gas output, to means for recycling the waste gas, which contains xenon and/or krypton and possibly gaseous fluorocompounds and/or fluorosulphur compounds, the said waste gas recycling means being connected, in addition, to the feed input of the said compression means so as to be able to feed the said compression means with at least some of the said waste gas.

More generally, within the context of the present invention, it has been demonstrated that permeability and selectivity properties of the membranes, particularly polymer membranes, can profitably be used to separate, in a very effective manner, the krypton and/or xenon molecules on the one hand, and the $CF_4$, $C_2F_6$ and $SF_6$ impurities on the other hand.

This is because, given that fluorosulphur compounds of the $SF_6$ type on the one hand and fluorocompounds, particularly the compounds $CF_4$ and $C_2F_6$, on the other hand permeate only very slightly, or even not at all, through conventional, especially polymer, membranes, gas mixtures containing krypton and xenon and contaminants of the $CF_4$, $C_2F_6$ and/or $SF_6$ type can be effectively separated by profiting from the very high selectivity of the membranes, particularly the polymer membranes, for xenon and krypton compared with fluorine- or fluorosulphur-containing impurities.

During the separation, the xenon and krypton come together again and are recovered essentially on the output or permeate side of the membrane or membranes used when these are of the conventional type.

In return for the very great simplicity of the process, it should be recalled that a very high selectivity is required in order to claim to separate the molecules with a high efficiency or with high purity.

BRIEF DESCRIPTION OF THE DRAWINGS

The invention will now be illustrated with the aid of examples of embodiments, given by way of illustration but implying no limitation, with reference to the appended figures.

DETAILED DESCRIPTION OF THE INVENTION

Figure 1:
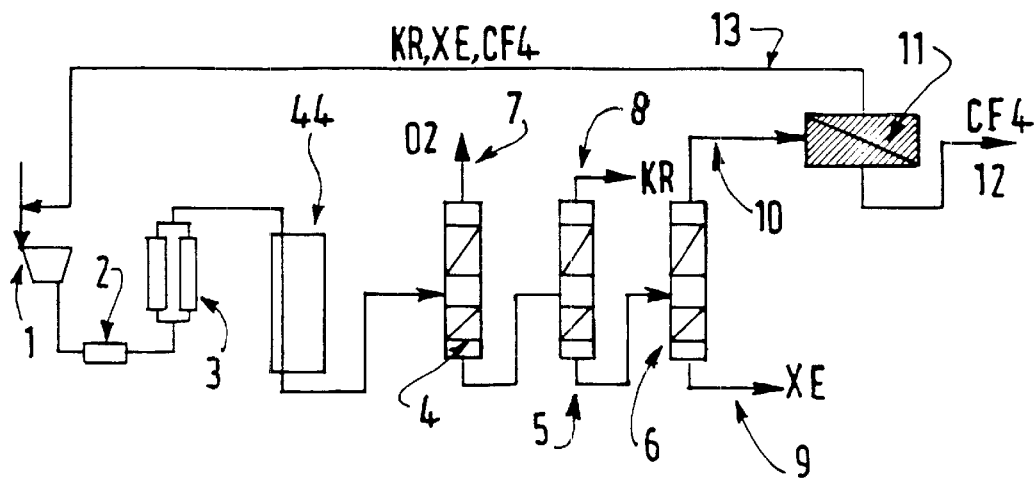
FIG. 1 is a schematic representation of a process of purifying waste gases containing xenon, krypton and $CF_4$-type impurities according to the invention.

FIG. 1 illustrates the application of a process according to the invention to the purification of the waste gases containing xenon and krypton, and $CF_4$-type impurities, resulting from the separation by cryogenic distillation of xenon and krypton from an Xe/Kr gas mixture contaminated with $CF_4$ impurities and other impurities, such as oxygen and hydrocarbons.

More specifically, an $Xe/Kr/CF_4/O_2/C_nH_m$ gas mixture (total Xe+Kr content >50%) is compressed (at 1) to a pressure of about 6 to 12 bar before being subjected to a catalytic oxidation (at 2) intended to oxidize, in the presence of oxygen and at a temperature of at least 120° C., the traces of hydrocarbons ($C_nH_m$) into carbon dioxide ($CO_2$) and water vapour ($H_2O$).

Next, the resulting gas stream is dried and decarbonated (at 3) in order to remove the water vapour and the carbon dioxide which are formed or were initially present, by means of an adsorption system based on two adsorbers operating alternately and each containing a bed of alumina in order to remove the water vapour and a bed of zeolite in order to remove the $CO_2$, respectively.

Next, the gas stream leaving the adsorption zone is cooled to a cryogenic temperature of less than approximately −80° C. in one or more heat exchangers 44, preferably to a temperature of between −100° C. and −150° C.

The $Kr/Xe/CF_4/O_2$ mixture thus cooled is then subjected to several separation steps by cryogenic distillation 4, 5 and 6.

More specifically, the $Kr/Xe/CF_4$ mixture containing traces of residual oxygen and possibly other residual volatile impurities, such as traces of nitrogen or argon, is firstly separated in a first cryogenic distillation column 4 so as, on the one hand, to remove (at 7) the oxygen and the other volatile impurities liable to be present in the $Kr/Xe/CF_4$ mixture and, on the other hand, to recover a mixture essentially consisting of krypton, xenon and $CF_4$, which mixture is then sent to a second distillation column 5 where it is separated in order to produce, on the one hand, ultra pure krypton (at 8) which is recovered, and, on the other hand, a gas mixture essentially containing xenon (Xe) and $CF_4$ as well as residual traces of krypton (Kr).

This $Xe/CF_4$ mixture (with traces of Kr) is then sent to a third cryogenic distillation column 6 where it is distilled in order to produce, on the one hand, pure xenon, which is covered (at 9), and, on the other hand, a gas mixture containing xenon, krypton and $CF_4$ in variable proportions, which gas mixture is sent (at 10) into one or more membranes 11 to be purified therein by permeation according to the process of the invention.

Preferably, one or more membrane modules based on hollow fibres are used as membranes.

More specifically, the $Kr/Xe/CF_4$ mixture feeds the membrane or membranes 11, and the fluorocompounds $CF_4$ or a $CF_4$-enriched non-permeating gas mixture (waste gas) is recovered on the waste gas side (i.e. in this case the retentate side), and an Xe/Kr permeation mixture possibly containing residual $CF_4$ is covered on the output side, (i.e. in this case the permeate side), which Xe/Kr mixture possibly containing residual $CF_4$ may then be taken back into the feed of the compressor 1 where it is mixed with the feed gas in order to undergo a new purification cycle.

Furthermore, the $CF_4$ produced may either be discharged into the atmosphere or recovered for other uses, or to be destroyed.

The process illustrated in FIG. 1 is particularly suitable when the selectivity of the membranes used does not allow the compounds to be separated with sufficient purity.

Figure 2:
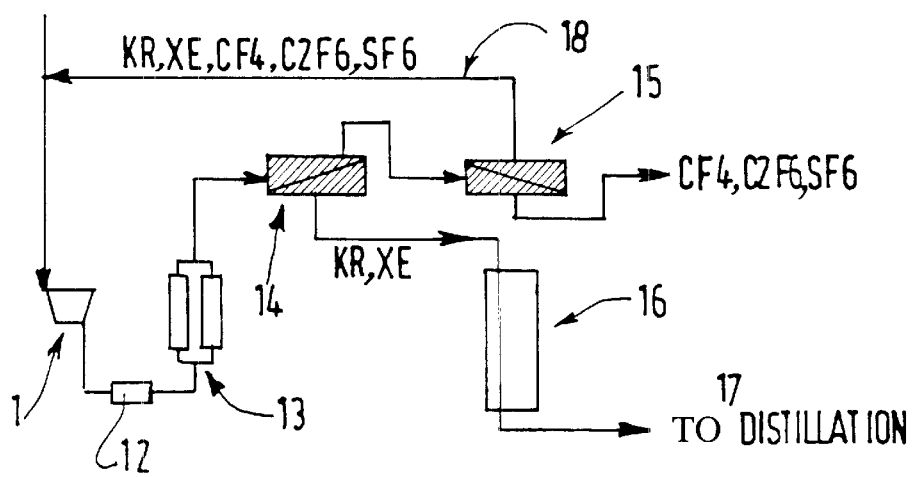
FIG. 2 depicts a process for separating the components of a gas feed mixture containing xenon, krypton, and fluorine-containing impurities.

However, if the selectivity of the membranes is high, a process as illustrated in FIG. 2 is preferred. In fact, FIG. 2 shows, schematically, a process for separating the components of a gas feed mixture essentially consisting of krypton and xenon and containing, in addition, fluorine-containing impurities $CF_4$, $C_2F_6$ and $SF_6$ and other impurities ($C_nH_m$) in varying proportions.

In this case, the feed mixture is firstly compressed (at 1) to a pressure of about 6 to 12 bar and then subjected to an oxidative catalysis step (at 12), as previously, in order to convert the possible traces of hydrocarbons into water vapour and $CO_2$, which traces are then removed by drying and/or decarbonization (at 13), as explained in the case of FIG. 1.

The gas stream obtained is then sent to several membrane modules 14, 15 arranged in cascade.

In this case, a mixture of krypton and xenon substantially free of fluorocompounds, i.e. containing fluorocompounds only in trace quantities (<10 ppm of PFC), is recovered at the permeate output side of the first membrane module 14, which Kr/Xe mixture containing traces of fluorocompounds can then, as in FIG. 1, be cooled (at 16) and undergo a cryogenic separation step (not detailed) at 17 in order to produce, on the one hand, pure krypton and, on the other hand, pure xenon. As previously, the residual oxygen may also be removed by cryogenic distillation.

Furthermore, in this case, a gas mixture containing the fluorocompounds ($CF_4$, $SF_6$, $C_2F_6$), which have not permeated, as well as xenon and krypton is recovered (at 14) on the retentate output side of the first membrane module 14.

This gas mixture enriched with fluorocompounds is then subjected to a second permeation step (at 15) so as to obtain, on the retentate output side of a second membrane module 15, a gas essentially containing the gaseous fluorocompounds which can be recycled and/or removed and, in addition, on the permeate outlet side, a hybrid gas containing fluorocompounds and most of the xenon and krypton which has not permeated through the first membrane module 14 (see above), which hybrid gas is then sent back to the compressor 1, via the line 18, to undergo a new purification cycle by being mixed with a feed gas.

Figure 3:
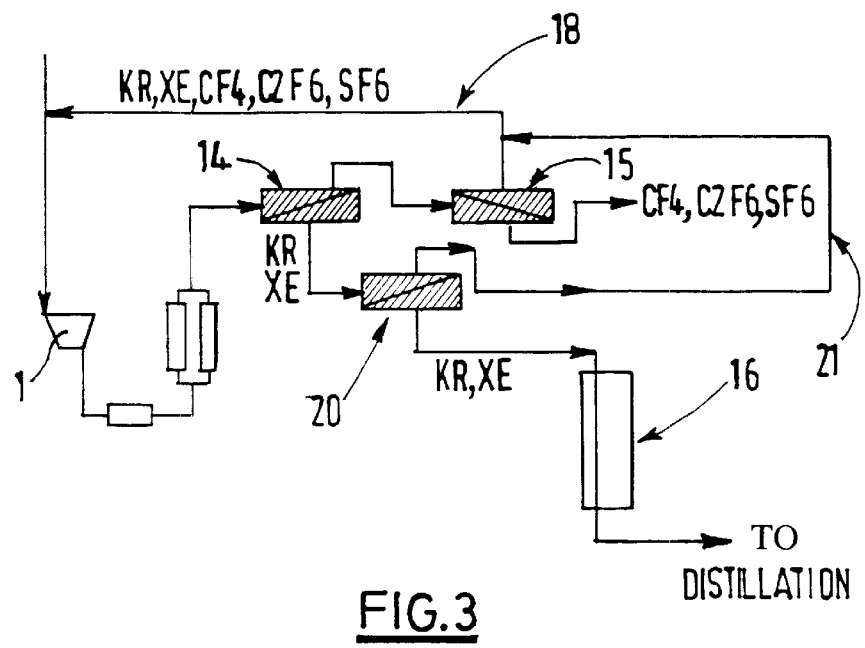
FIG. 3 depicts a variant of the process shown in FIG. 2, in which the staging of the membranes has been modified.

FIG. 3 shows a variant of FIG. 2, in which the staging of the membranes has been modified so as to be able to achieve, for example, a required purity of the Kr/Xe gas stream entering the cryogenic cooling unit 16.

In fact, FIG. 3 shows that the permeating gas stream essentially containing krypton and xenon, recovered on the permeate output side of the membrane 14, is also subjected to an additional permeation step (at 20) before being sent to the cryogenic cooling unit 16, usually called the cold box.

Furthermore, the stream recovered on the retentate output side may, for example, be recycled as explained above in the case of FIG. 2 and sent back to the compressor 1, via the lines 21 and 18.

Figure 4:
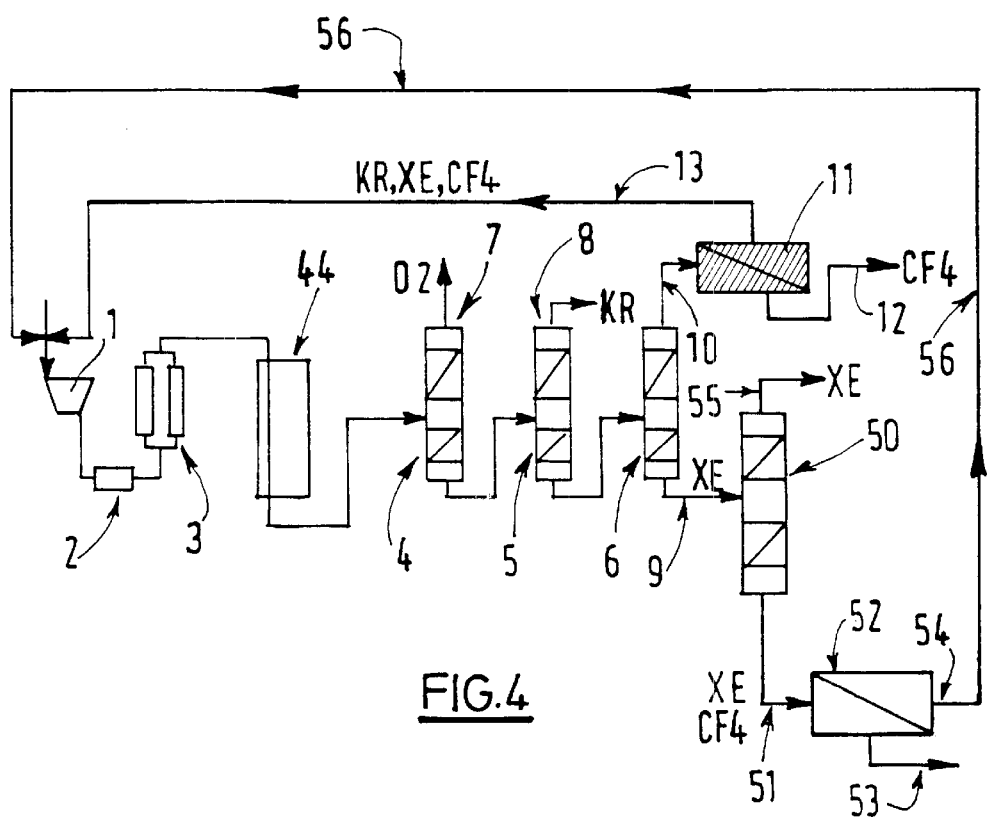
FIG. 4 depicts a variant of the process shown in FIG. 1, in which pure xenon is recovered.

FIG. 4 shows a variant of FIG. 1, in which pure xenon is recovered (at 9) after distillation of the Xe/$CF_4$ mixture (containing traces of Kr) in the third cryogenic distillation column 6 and is sent to a fourth cryogenic distillation column 50 where it undergoes a new cryogenic separation step so as to purify the xenon of its possible heavy fluoro- and/or fluorosulphur-containing impurities such as $SF_6$ and $C_2F_6$, and thus, on the one hand, to recover (at 55) even purer xenon and, on the other hand, to obtain a stream of xenon which is pure but may still contain a few fluorine- and/or fluorosulphur-containing impurities, which stream is taken, via the line 51, into one or more other membranes 52 in order to be purified therein by permeation in accordance with the process of the invention.

Here again, the fluorocompounds and/or fluorosulphur compounds or a non-permeating gas mixture enriched with fluorocompounds and/or fluorosulphur compounds are recovered on the waste gas side, i.e. in this case the retentate side (at 53), and a production mixture, essentially Xe, is recovered at the output side, i.e. in this case the permeate side (at 54), which mixture can then be sent back, via the line 56, to the feed of the compressor 1 where it is mixed with the feed gas in order to undergo a new purification cycle.

Furthermore, the fluorine- and/or fluorosulphur-containing impurities produced (at 53) may either be discharged into the atmosphere or recovered for other uses, or may be destroyed.

Of course, depending on the actual selectivities of the membranes, on the nature of the impurities and on their contents, it is possible to combine the above arrangements or to use the membranes differently according to the different methods.

Moreover, the operating simplicity of the membranes makes the process for removing $CF_4$, $C_2F_6$, $SF_6$ according to the invention very competitive in comparison with the alternative processes cited in the prior art.

Within the context of the invention, it is preferred to use membranes sold by the company MEDAL.

According to a first application, the xenon and/or krypton gases or gas mixtures purified by the process according to the invention are particularly suitable for use as inter-pane insulation gas for a sealed multiple-glazing unit or for a sealed unit comprising several panes separated by insulation gas, particularly double-glazing windows.

According to a second application, the xenon and/or krypton gases or gas mixtures purified by the process according to the invention are particularly suitable for use as plasma propulsion gas for a vehicle or structure propelled by a gas plasma, particularly for a satellite using plasma propulsion.

What is claimed is:

1. Process for removing at least some of the gaseous fluorocompounds and/or fluorosulphur compounds present in a feed gas formed from a mixture of xenon and krypton, which comprises:
   (i) contacting the feed gas containing xenon and krypton and said gaseous fluorocompounds and/or fluorosulphur compounds with at least one first membrane having an output side and a waste gas side;
   (ii) recovering a production gas formed from a mixture of xenon and/or krypton stripped of at least some of said gaseous fluorocompounds and/or fluorosulphur compounds on the output side of said first membrane;
   (iii) subjecting the production gas to at least one cryogenic distillation step; and
   (iv) after cryogenic distillation, recovering at least one of a stream of krypton, substantially free of said gaseous fluorocompounds and/or fluorosulphur compounds, and a stream of xenon, substantially free of said gaseous fluorocompounds and/or fluorosulphur compounds.

2. The process according to claim 1, wherein the gaseous fluorocompounds and/or fluorosulphur compounds are present in a recycling gas coming from a process generating at least said recycling gas.

3. The process according to claim 1, further comprising recovering in step (ii) a stream of waste gas containing at least some of said gaseous fluorocompounds and/or fluorosulphur compounds on the waste gas side of said first membrane.

4. The process according to claim 1, wherein the gas feed contains at least 40% xenon and 40% krypton, and the gas feed contains xenon and krypton with a concentration of more than 99.999% and from 1 ppb to 300,000 ppm of fluorocompounds or fluorosulphur compounds.

5. The process according to claim 4, wherein the gas feed contains from 10 ppb to 50,000 ppm of fluorocompounds or fluorosulphur,compounds.

6. The process according to claim 1, wherein the fluorocompounds or fluorosulphur compounds are selected from the group consisting of $CF_4 C_2F_6$, $SF_6$ and mixtures thereof.

7. The process according to claim 1, wherein the gas feed contains from 0.01 ppm to 1000 ppm of $CF_4$, from 0.01 ppm to 10000 ppm of $SF_6$ and from 0.01 ppm to less than 200 ppm of $C_2F6$.

8. The process according to claim 1, further comprising introducing into a feed inlet of at least 1 second membrane the production gas recovered in step (ii) on the output side of the first membrane and containing at least some of the xenon and/or krypton.

9. The process according to claim 3, further comprising introducing into a feed inlet of at least one third membrane the stream of waste gas recovered in step (ii) on the waste gas side of the first membrane and containing at least some of the gaseous fluorocompounds and/or fluorosulphur compounds.

10. The process according to claim 1, wherein the gas feed is a temperature ranging from $-10°$ C. to $+100°$ C., and at a pressure ranging from 1 bar to 50 bar.

11. The process according to claim 1, wherein the first membrane is made of a polymer.

12. The process according to claim 1, wherein the gas feed additionally contains hydrocarbon impurities which are converted by catalytic oxidation at a temperature of between $150°$ C. and $500°$ C. in the presence of oxygen into $CO_2$ and $H_2O$.

13. The process according to claim 1, further comprising removing $CO_2$ and $H_2O$ impurities present in the feed gas by adsorption or drying on at least one adsorbent.

14. The process according to claim 1, further comprising cooling the production gas recovered at step (ii) to a temperature of less than $-5°$ C.

15. The process according to claim 14, wherein the production gas is cooled to a temperature ranging from $-10°$ C. to $-150°$ C.

16. The process according to claim 1, further comprising introducing the production gas recovered in step (ii) on the output side of the first membrane into a feed inlet of a second membrane; recovering a second waste gas on a waste gas side of the second membrane; and introducing the second waste gas into the gas feed.

17. The process according to claim 3, further comprising introducing the stream of waste gas recovered in step (ii) on the waste gas side of the first membrane into a feed inlet of a third membrane; recovering a second production gas on an output side of the third membrane; and introducing the second production gas into the gas feed.

18. The process according to claim 1, wherein at least some of the gaseous fluorocompounds or fluorosulphur compounds are separated by one or more permeation steps.

19. The process according to claim 1, further comprising compressing the gas feed to a pressure ranging from 3 bar to 30 bar.

* * * * *